(12) United States Patent
Aziz et al.

(10) Patent No.: US 8,279,950 B2
(45) Date of Patent: Oct. 2, 2012

(54) COMPENSATION FOR TRANSMISSION LINE LENGTH VARIATION IN A SERDES SYSTEM

(75) Inventors: Pervez M. Aziz, Dallas, TX (US); Adam Healey, Newburyport, MA (US); Shawn Logan, Andover, MA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/243,190

(22) Filed: Sep. 23, 2011

(65) Prior Publication Data
US 2012/0014460 A1  Jan. 19, 2012

Related U.S. Application Data

(63) Continuation of application No. 12/370,230, filed on Feb. 12, 2009, now Pat. No. 8,054,892.

(51) Int. Cl.
*H04B 3/00* (2006.01)
*H04L 25/00* (2006.01)

(52) U.S. Cl. ........ 375/257; 375/211; 375/219; 375/221; 375/295

(58) Field of Classification Search .................. 375/211, 375/219, 295, 221, 257
See application file for complete search history.

(56) References Cited

U.S. PATENT DOCUMENTS

6,937,788 B2 * 8/2005 Ramachandran ............... 385/28
7,672,310 B2 * 3/2010 Cooper et al. ........... 370/395.21
* cited by examiner

*Primary Examiner* — Ted Wang (57) ABSTRACT

Described embodiments provide a method and system for signal compensation in a SERDES communication system that includes monitoring the quality of a data signal after passing through a transmission channel. The quality of the data signal is monitored with at least one of a BER calculation algorithm and a received eye quality monitoring algorithm. Variations in channel length of the transmission channel are compensated for by i) adjusting a length of transmission line delay of the data signal from the transmission channel, ii) comparing the data signal quality with a threshold for the adjusted data signal; and iii) repeating i) and ii) until the data signal quality meets the threshold.

20 Claims, 7 Drawing Sheets

COMPENSATION FOR TRANSMISSION LINE LENGTH VARIATION IN A SERDES SYSTEM

CROSS-REFERENCE TO RELATED APPLICATIONS

This application is a continuation of U.S. patent application Ser. No. 12/370,230, filed on Feb. 12, 2009 now U.S. Pat. No. 8,054,892, and entitled "Compensating Transmission to Reduce Sensitivity of Performance due to Channel Length Variation," which is hereby incorporated by reference in its entirety

BACKGROUND OF THE INVENTION

1. Field of the Invention

The present invention relates generally to data communications, and, in particular, to a method and system for compensating for transmission line length variations in a serializer/deserializer (SERDES) transmission channel, such as a backplane.

2. Description of the Related Art

As data transmission rates continue to increase, parallel data transmission in backplane and other interconnect applications suffers from effects such as co-channel interference and electromagnetic interference (EMI). To correct for problems associated with high-speed parallel data transmission, parallel data may be serialized before transmission and then de-serialized upon reception. To achieve the transition between parallel and serial data transmission, serializer/deserializer (SERDES) devices are incorporated at both the transmitting and receiving ends of the serial data stream.

A SERDES device generally comprises at least one receiver and transmitter pair in the same core. The SERDES receiver is designed to receive serialized signals transmitted from a remote transmitter over a transmission channel, and convert the data into parallel format (deserializing) so the data may be further processed. The SERDES transmitter is designed to receive parallel data from the internal core, and serialize it for transmission to a remote receiver over the transmission channel.

Figure 1:
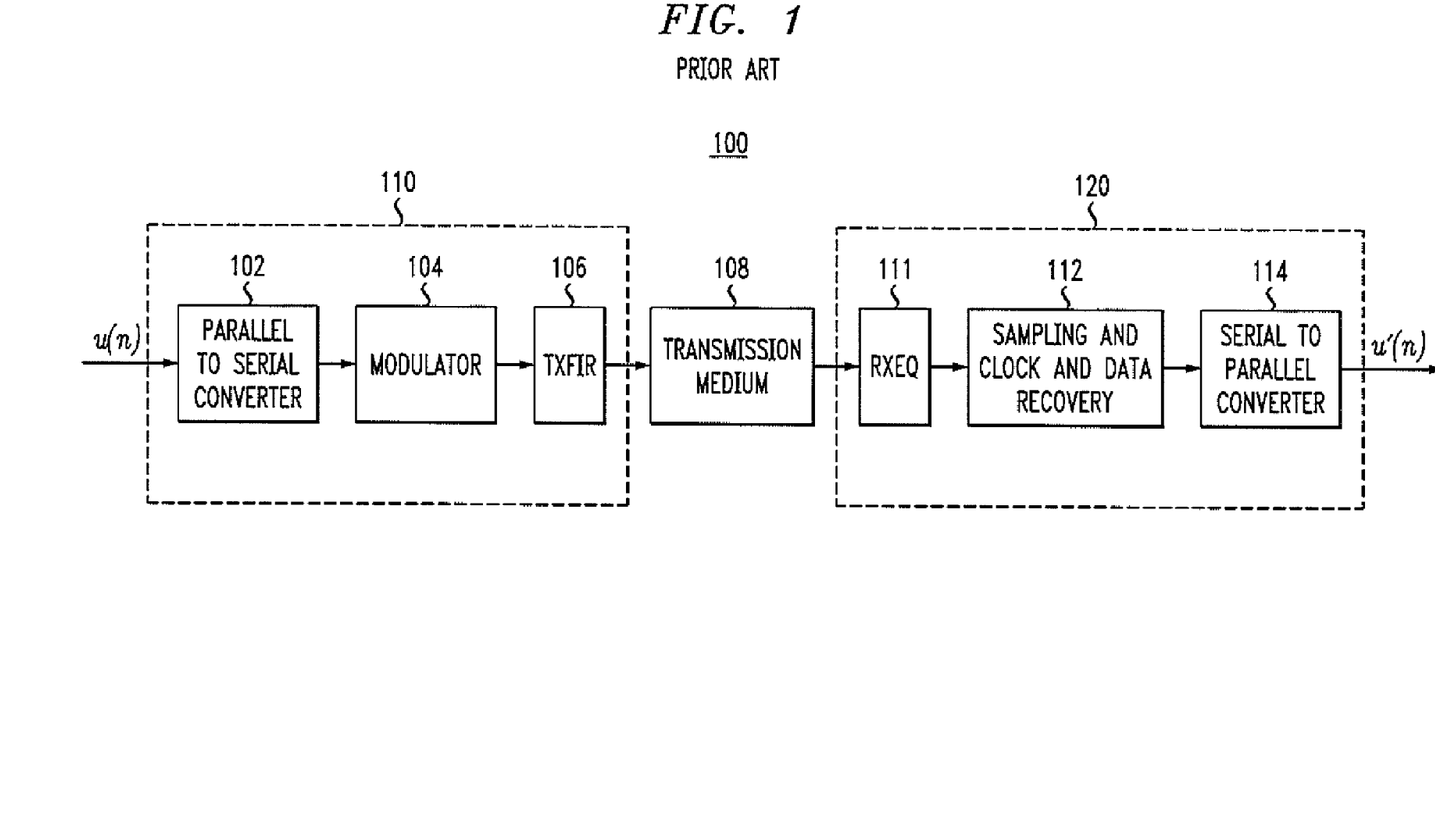
FIG. 1 shows a block diagram of a prior art SERDES communication system.

FIG. 1 shows a block diagram of generic SERDES communication system 100. As shown in FIG. 1, SERDES communication system 100 comprises transmitting SERDES device 110, receiving SERDES device 120 and transmission channel 108. Parallel data stream u(n) is provided to transmitting SERDES device 110, where data stream 100 is converted to a serial data stream by serializer 102. The serial data stream from serializer 102 is then modulated by modulator 104. The modulation may be a modulation technique such as non-return to zero (NRZ) modulation or higher level modulation techniques such as pulse amplitude modulation (PAM). The modulated signal from modulator 104 is then filtered by transmit finite impulse response filter (TXFIR) 106 before being provided to transmission channel 108. Transmission channel 108 might be a physical transmission medium such as a backplane. After passing through transmission channel 108, the transmitted signal is filtered and equalized by receive equalizer (RXEQ) 111, which might be, for example, a continuous-time filter. The output of RXEQ 111 is sampled using a sample clock recovered from the transmitted data by clock and data recovery circuit (CDR) 112. CDR 112 might typically be implemented as an adaptive feedback circuit to adjust the phase and frequency of the recovered clock to allow proper data recovery. Data recovery is performed by a data detector (not shown in FIG. 1). The data detector is often a slicer that is clocked by the recovered clock to quantize the sampled data to a binary 1 or 0 based upon a threshold amplitude. The detected data may then be provided for additional processing, such as decision feedback equalization (DFE) (not shown in FIG. 1). The detected serial data may then be converted to parallel data by serial to parallel converter 114, which provides parallel data stream u'(n).

In FIG. 1, transmission channel 108 and analog SERDES components (e.g. 102, 104, 106, 111, 112, 114) are shown as 1-port devices, meaning that there is one input port and one output port related by a single transfer function. However, at high data rates, transmission channel 108 and/or analog SERDES components may behave as 2-port transmission lines, where multiple inputs and outputs are related by multiple transfer functions.

Figure 2:
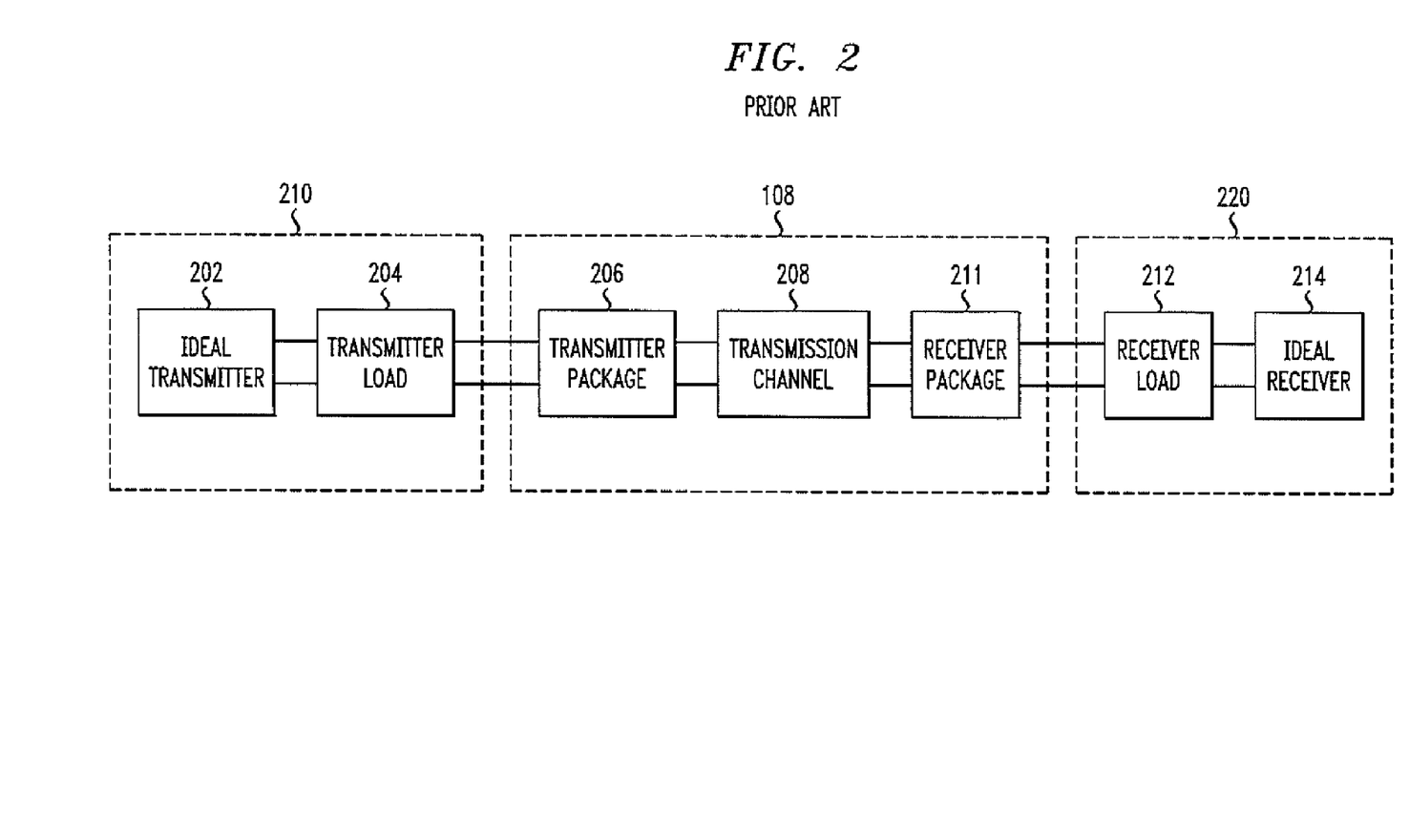
FIG. 2 shows a 2-port representation of the SERDES transmission system of FIG. 1.

As shown in FIG. 2, transmitting SERDES device 110, transmission channel 108 and receiving SERDES device 120 of FIG. 1 may be represented as a cascade of 2-port components. Transmitting SERDES device 110 comprises ideal transmitter 202 and transmitter load 204. Transmission medium 108 comprises transmitter package 206, transmission channel 208 and receiver package 211. Receiving SERDES device 220 comprises receiver load 212 and ideal receiver 214. As shown, ideal transmitter 202 and transmitter load 204 are located on the silicon chip of transmitting SERDES device 210. Transmitter package 206 represents the substrate that is used to house the silicon chip and to provide a physical interface between the silicon chip and a printed circuit board, wherein the printed circuit board also provides an interface to transmission channel 208. Similarly, receiver load 212 and ideal receiver 214 are located on the chip of receiving SERDES device 220, and receiver package 211 represents the substrate that is used to house the silicon chip and to provide a physical interface between the silicon chip and a printed circuit board, wherein the printed circuit board also provides an interface to transmission channel 208. The length of transmission channel 208 may vary in each SERDES communication system implementation, causing the overall length of transmission medium 108 to be variable.

A variation of the length of transmission medium 108 might cause a non-trivial change in the BER of a given receiver because, in general, a variation in the transmission channel length might be modeled equivalently by a delay. In a 1-port system, such a delay causes the output signal to be delayed by the same amount. However, in a 2-port system, such a delay changes the transfer function of the transmission channel.

SUMMARY OF THE INVENTION

In an exemplary embodiment, the present invention provides for signal compensation in a SERDES communication system that includes monitoring the quality of a data signal after passing through a transmission channel. The quality of the data signal is monitored with at least one of a BER calculation algorithm and a received eye quality monitoring algorithm. Variations in channel length of the transmission channel are compensated for by i) adjusting a length of transmission line delay of the data signal from the transmission channel, ii) comparing the data signal quality with a threshold for the adjusted data signal; and iii) repeating i) and ii) until the data signal quality meets the threshold.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 3:
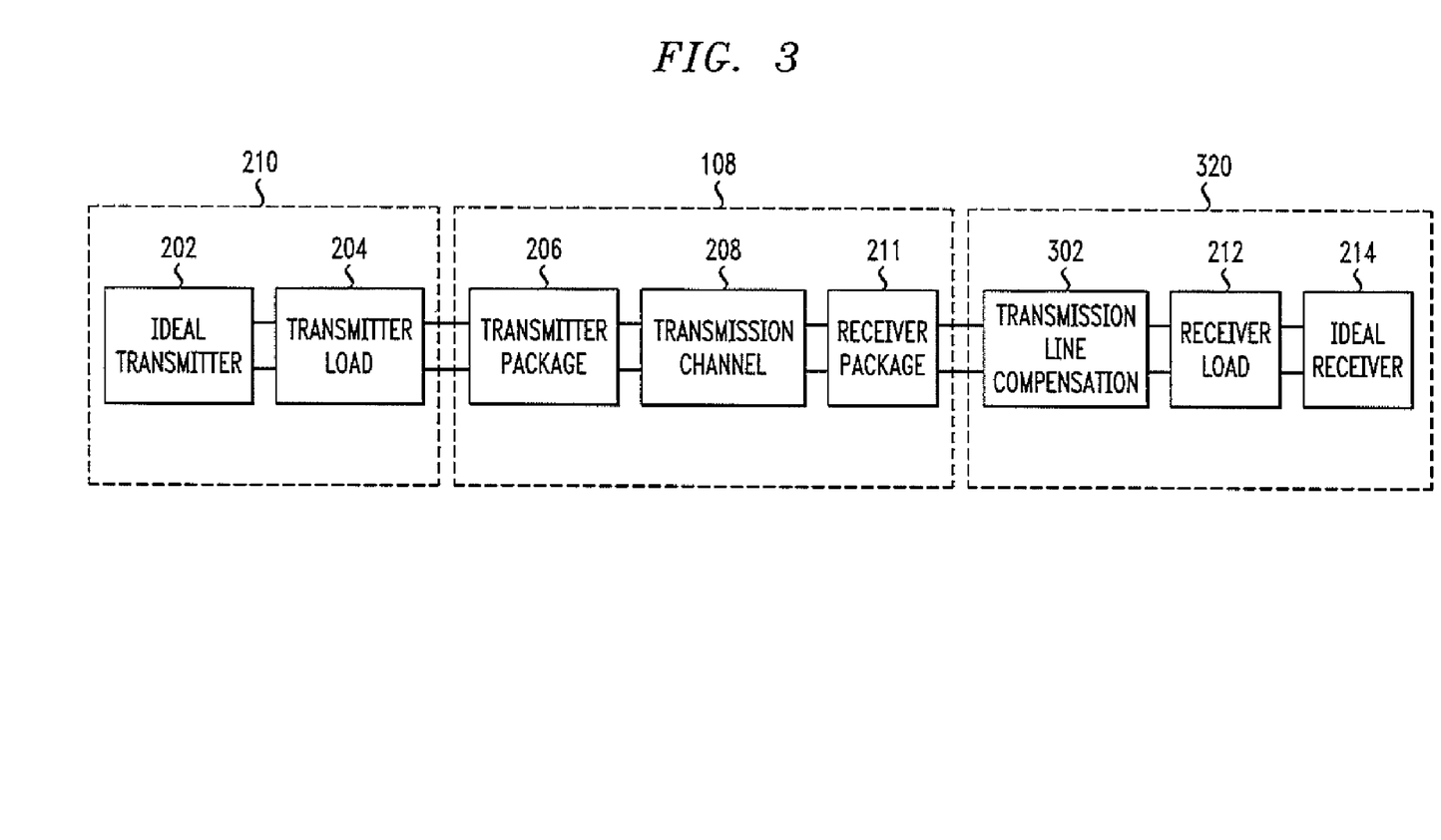
FIG. 3 shows a block diagram of a two-port SERDES communication system in accordance with an exemplary embodiment of the present invention.
Figure 4:
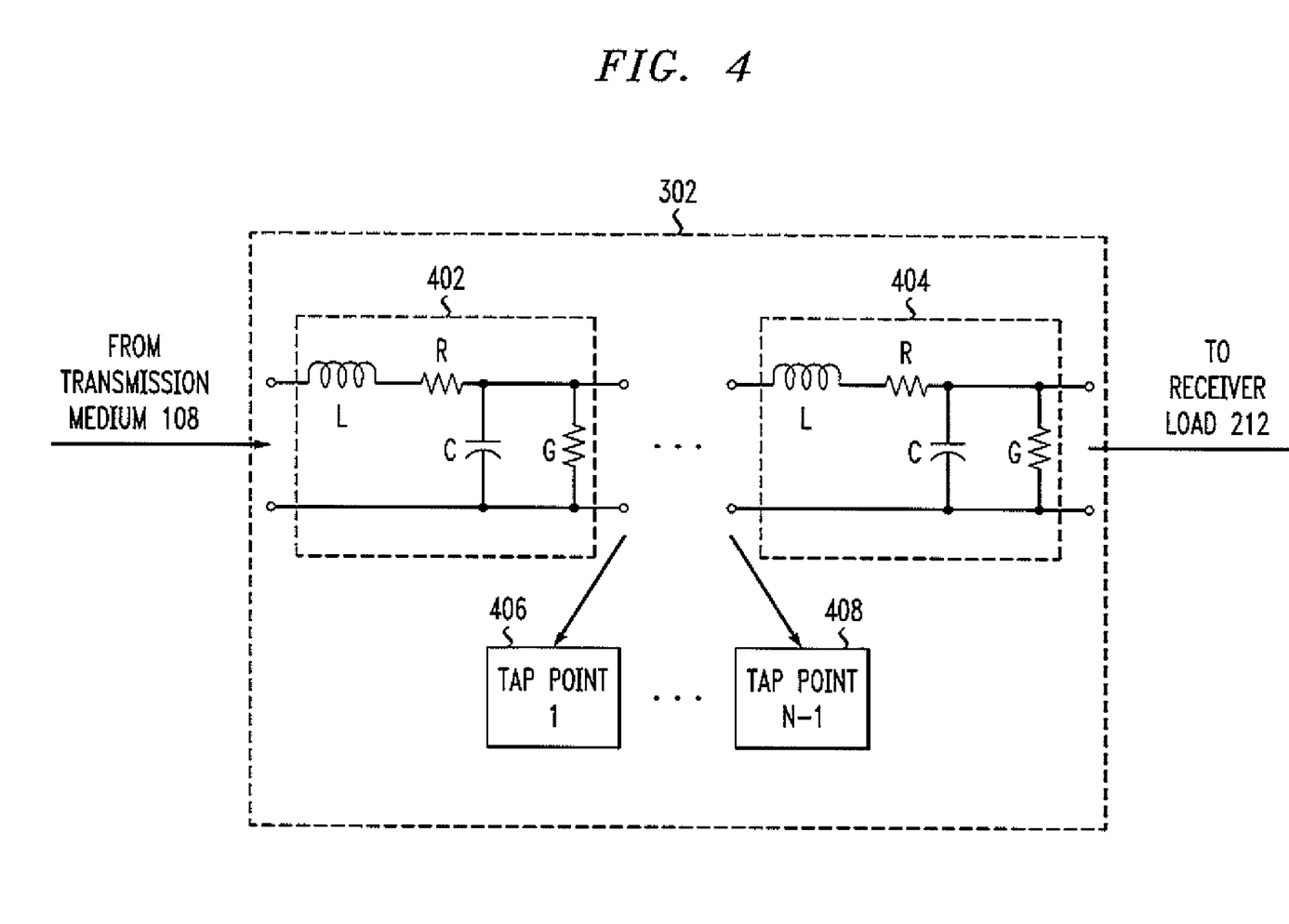
FIG. 4 shows greater detail of the transmission line compensation circuit of FIG. 3 in accordance with an embodiment of the present invention.
Figure 5:
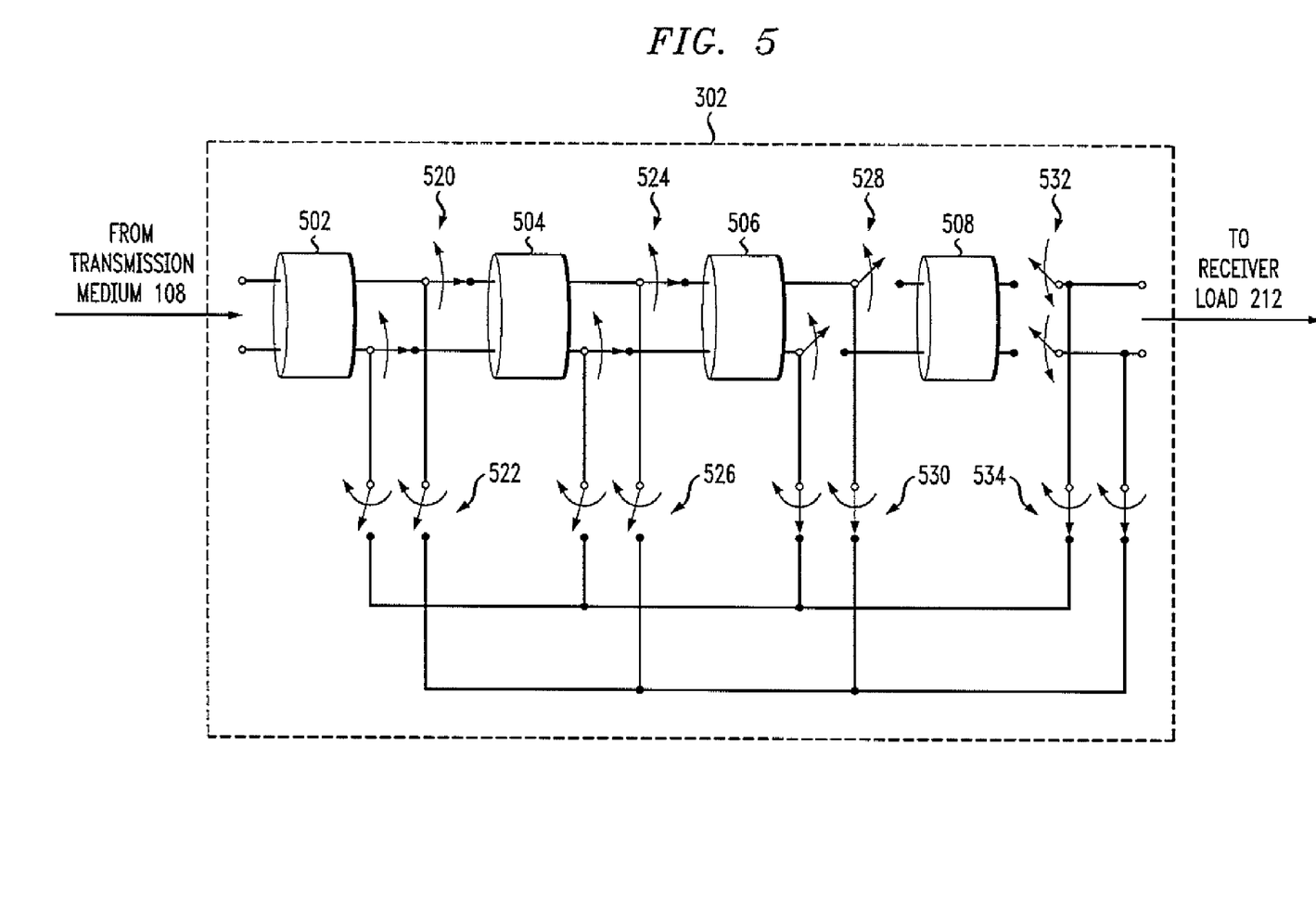
FIG. 5 shows greater detail of the transmission line compensation circuit of FIG. 3 in accordance with an embodiment of the present invention.
Figure 6:
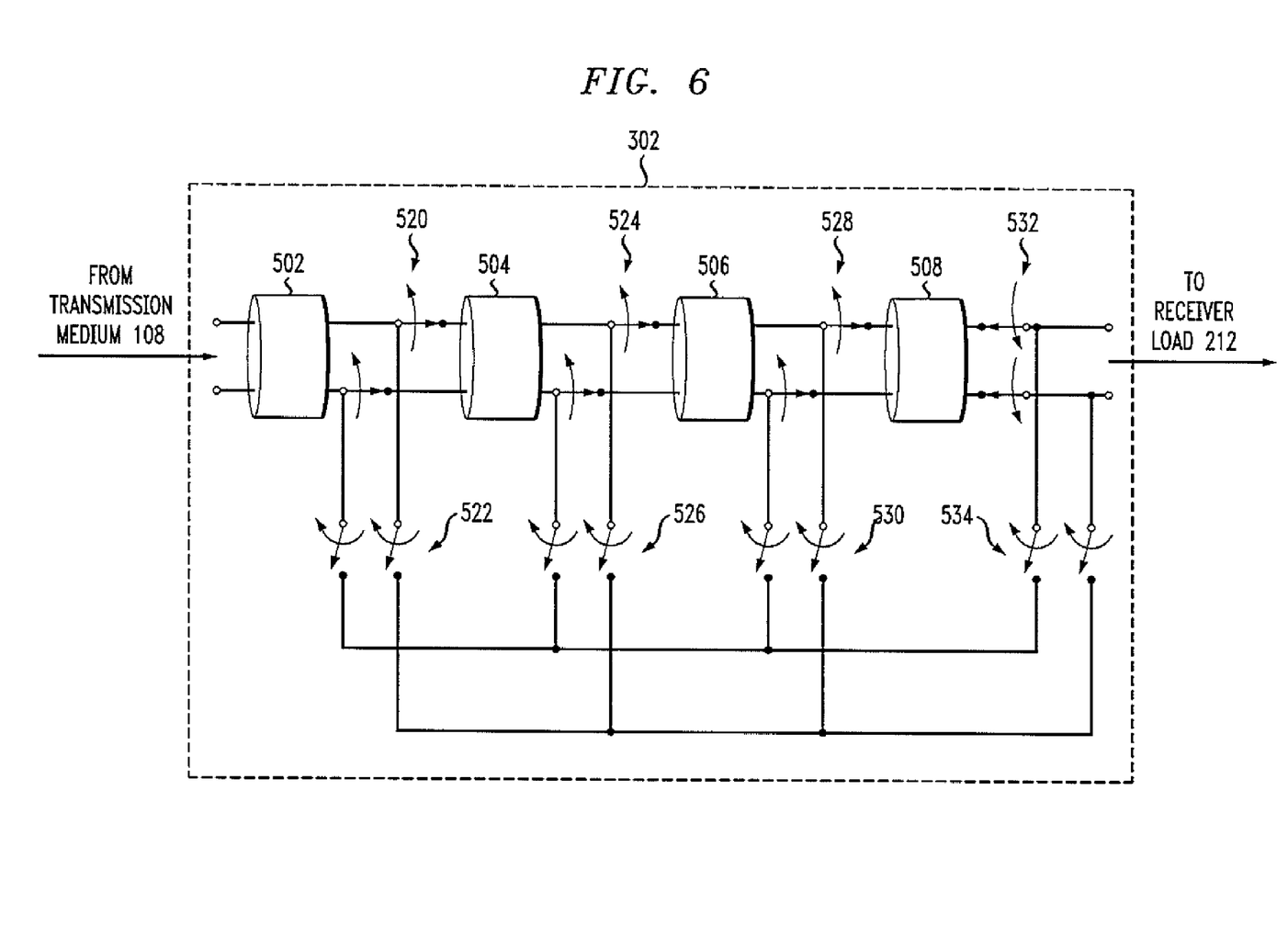
FIG. 6 shows another diagram of the transmission line compensation circuit of FIG. 5 in accordance with an embodiment of the present invention; and, FIG. 7 shows a block diagram for a method for compensating for transmission line length variations in a SERDES communication channel in accordance with an exemplary embodiment of the present invention.

FIG. 3 shows a block diagram of a two-port SERDES communication channel in accordance with an exemplary embodiment of the present invention. As shown in FIG. 3, transmission line compensation (TLC) circuit 302 is added to the front-end of the receiving SERDES device 320. Receiver load 212 and ideal receiver 214 operate analogously as described in regard to FIG. 2. As will be described in greater detail below, TLC circuit 302 is introduced between receiver package 210 and receiver load 212. TLC circuit 302 is adapted to modify the overall transfer function of transmission medium 108 to compensate for variations in the transfer function caused by variations in the length of transmission channel 208. As shown, TLC circuit 302 may be implemented as an on-chip analog delay term. Such a delay term may be approximated by and implemented using a transmission line stricture, as shown in FIGS. 4, 5 and 6. To achieve a delay term of adjustable time duration, a transmission line of variable length must be implemented. Such a transmission line would have segments of determined length with selectable tap points between the segments.

FIG. 4 shows TLC circuit 302 of FIG. 3 as a transmission line modeled as lumped element equivalent components in accordance with an embodiment of the present invention, as will be described in greater detail below.

FIG. 5 shows an exemplary embodiment of TLC circuit 302 of FIG. 3. As shown in FIG. 5, an exemplary embodiment of TLC circuit 302 comprises four segments of transmission line, shown as 502, 504, 506 and 508. Each transmission line segment 502, 504, 506 and 508 implements an effective analog delay term, as described. Delay terms may be selected so as to be a fraction of the baud period of the SERDES serial data rate. In one exemplary embodiment, each transmission line segment implements an equal delay term, for example, when there are four transmission line segments, each segment represents ¼ of the overall delay term for TLC circuit 302. However, in other exemplary embodiments, each transmission line segment implements unequal delay terms to achieve a wider range of compensation. Further, as would be apparent to one of skill in the art, the number of transmission line segments is not limited to four, and other numbers of segments might be implemented.

Transmission line segments 502, 504, 506 and 508 are configured in a manner so as to be switched into or out of the transmission path by switches 520, 522, 524, 526, 528, 530, 532 and 534. The configuration of the switches allows adjusting the total analog delay that is switched into the transmission path between transmission medium 108 and receiver load 212, and thus is adapted to compensate for variations in the length of transmission medium 108. Switches 522, 526, 530 and 534 comprise selectable tap points (shown as 406 and 408 in FIG. 4) in the overall length of the transmission line. Any unused transmission line segment is desirably disconnected from the transmission path to prevent the transmission line segment from acting as a stub, changing the reactance and, thus, the transfer function of transmission line compensation circuit 302. Therefore, switches 520, 522, 524, 526, 528, 530, 532 and 534 are configured such that any unused transmission line segment might be entirely removed from the circuit.

As shown in FIG. 5, transmission line segments 502, 504 and 506 are switched into the transmission path because switches 520, 524, 530 and 534 are in the closed position and switches 522, 526, 528 and 532 are in the open position. Transmission line segment 508 is entirely switched out of the circuit by switches 528 and 532 being in the open position.

FIG. 6 shows another block diagram of transmission line compensation circuit 302 of FIG. 3 in accordance with an embodiment of the present invention. In FIG. 6, switches 520, 522, 524, 526, 528, 530, 532 and 534 are configured such that all four transmission line segments 502, 504, 506 and 508 are switched into the transmission path, thus resulting in the largest overall delay term that may be achieved by transmission line compensation circuit 302. Switches 522, 526, 530 and 534 are in the open position because the intermediate tap points are not required when all of the transmission line segments are switched into the transmission path.

Referring back to FIG. 4, as would be known to one of skill in the art, a transmission line may be modeled as a series of N two-port elementary electrical components. Each of the N blocks of elementary components represents a unit of length of the transmission line, where L is the inductance of the transmission line per unit length, R is the resistance of the transmission line per unit length, C is the capacitance of the transmission line per unit length and G is the conductance of the dielectric material separating the two conductors per unit length. Thus, TLC circuit 302 may be modeled as a series of N 2-port elementary electrical components, shown as 402 and 404, where N is an integer, and where each of the N blocks of elementary components is separated by a selectable tap point, shown as 406 and 408. As was described in greater detail with regard to FIGS. 5 and 6, selectable tap points 406 and 408 are configured to adjust the total analog delay that is switched into the transmission path between transmission medium 108 and receiver load 212.

While FIGS. 5 and 6 show linear transmission line segments, the present invention is not so limited, and actual implementations might rather be circular or rectangular. As would be appreciated by one of skill in the art, a circular or rectangular layout may provide that the tap points between the transmission line segments of compensation circuit 302 are of approximately equal physical distance from the input of receiver load 212. Further, due to the location of transmission line compensation circuit 302, the increased physical distance between transmission medium 108 and the receiver load 212 may provide for some improvement in the electrostatic discharge (ESD) robustness of receiving SERDES device 320.

In an exemplary embodiment of the present invention, switches 520, 522, 524, 526, 528, 530, 532 and 534 are implemented as MOS devices. As would be apparent to one of skill in the art, the size of the MOS devices will be dependent upon the frequency range of operation and upon the return loss and insertion loss requirements of the application of receiving SERDES device 320. In one exemplary embodiment, the switches are configured manually. In this embodiment, if the user has knowledge of the application frequency of operation and of the physical length of the transmission medium 108, recommended switch settings to optimize the bit error rate (BER) might be provided by the manufacturer of an implementation of SERDES device 320.

Figure 7:
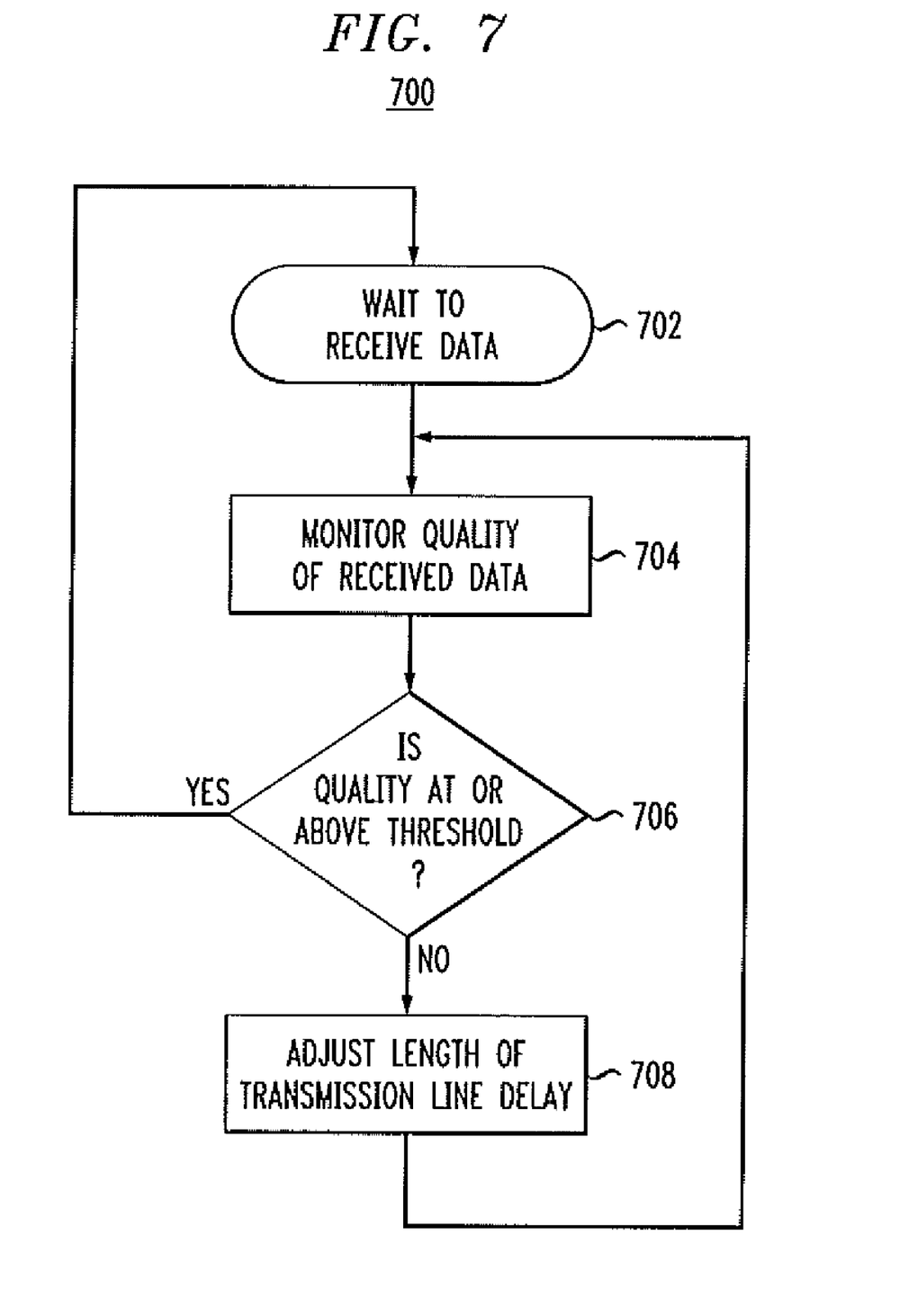

In some preferred embodiments, control for MOS switches is through an adaptive algorithm that automatically adjusts switches 520, 522, 524, 526, 528, 530, 532 and 534. Such an adaptive algorithm might be designed to optimize the BER of SERDES device 320. FIG. 7 shows exemplary method 700 as an adaptive algorithm for automatically adjusting the total analog delay of TLC 302. Method 700 waits to receive data at step 702. Once data is received, the quality of the received data signal is monitored at step 704. The monitored quality of the received data signal is compared to a predefined threshold at step 706. Based upon this comparison, method 700 may return to step 702 to wait for additional data to be received, or method 700 may proceed to step 708 to adjust the amount of delay of TLC 302. Method 700 then returns to steps 704 and 706 to recompare the quality of the received data signal to the threshold value.

In exemplary embodiments, the received signal quality might be monitored by either a bit error rate (BER) calculation algorithm or a received eye quality monitoring algorithm, where the length of transmission line delay is adjusted based on a calculated BER from the BER calculation algorithm or eye characteristics from the received eye quality monitoring algorithm, respectively. For example, a received eye quality monitoring algorithm might be adapted to also adjust the settings of switches 520, 522, 524, 526, 528, 530, 532 and 534.

An eye monitor implementing a received eye quality monitoring algorithm is based on the fact that integrity of high-speed data detection might be studied in terms of an eye diagram, where traces of received signal waveforms are overlaid on top of each other for a time period of one or more unit intervals (Ills). An eye diagram has a vertical dimension (y-axis) in, for example, millivolts (mV) and a horizontal dimension (x-axis) in, for example, picoseconds (ps). The form of the eye is dependent on processes employed to detect and recover the data (for example by CDR 112 of FIG. 1). Such processes include adaptive equalization applied to the input signal at the front end of the CDR system (for example RXEQ 111 of FIG. 1), and decision feedback equalization (DFE) employing decisions for previously detected data in the equalized signal.

For relatively optimal performance by an equalization algorithm, two conditions are preferred: first, the eye opening for equalized input signal should be large in the vertical and horizontal directions, and second, data latches employed to make a decision for the data should operate near the center of the eye resolved by the DFE. Based on previous data decisions, the algorithm locates two DFE-resolved eyes: one eye at the top and one eye at the bottom of the eye diagram. For example, a decision at the top of the eye diagram corresponds to a trace from a previous bit value of logic "1" to the current bit value, and a decision at the bottom of the eye diagram corresponds to a trace from a previous bit value of logic "0" to the current bit value.

Both DFE-eye openings are relatively larger than both non-DFE eye openings. The CDR systems employs at least two data latches, with one latch point allocated to a decision for the top eye opening and one latch point allocated to the bottom eye opening. The algorithm sets the decision threshold for each data latch at the center of the corresponding eye opening, with such setting for each decision threshold having a corresponding vertical position controlled by an amplitude threshold and a corresponding horizontal position controlled by a phase threshold. Note that the width of the DFE resolved eye is wider due to enhanced DFE timing margin, and that the height of the DFE resolved eye is higher due to enhanced DFE noise margin.

Techniques for monitoring a data eye in a CDR system, while the CDR system is operating (i.e., "on-line"), are described in U.S. patent application Ser. No. 11/095,178, filed on Mar. 31, 2005 and having a common assignee with the assignee of this application. The disclosure of Ser. No. 11/095,178 is incorporated in its entirety herein by reference.

This application describes different embodiments of the present invention. So as not to obscure the invention, some specific details of the various embodiments that are within the knowledge of a person of ordinary skill in the art may not be discussed herein.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general-purpose computer.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bit stream or other sequence of signal values electrically or optically transmitted through a medium, stored magnetic-field variations in a magnetic recording medium, etc., generated using a method and/or an apparatus of the present invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

We claim:

1. A method of signal compensation in a SERDES communication system comprising:
   a) monitoring an eye quality of a data signal after passing through a transmission channel with a received eye quality monitoring algorithm;
   b) compensating for channel length variations of the transmission channel by the steps of
      i) adjusting a length of transmission line delay of the data signal from the transmission channel based on eye characteristics from the received eye quality monitoring algorithm;
      ii) comparing the data signal eye quality with a threshold for the adjusted data signal; and
      iii) repeating steps i) and ii) until the data signal eye quality meets the threshold.

2. The invention as recited in claim 1, wherein the step b 1) adjusts the length of transmission line delay by the step of configuring switches adapted to provide intermediate tap points between a plurality of transmission line segments, each transmission line segment providing a corresponding portion of the length of transmission line delay.

3. The invention as recited in claim 2, wherein the length of transmission line delay is substantially equal to a fraction of the baud period of a serial data rate of the SERDES communication system.

4. The invention as recited in claim 1, wherein the eye quality of the data signal is monitored by obtaining a plurality of samples of said data signal for each unit interval based on a clock recovered from said data signal.

5. The invention of claim 4, wherein said obtaining step is performed substantially simultaneous to a decoding of said data signal.

6. The invention of claim 4, wherein said obtaining step further comprises the steps of sampling said received signal using a plurality of latches and estimating a value of said received signal by comparing values of said latches.

7. The invention of claim 6, wherein said plurality of latches are clocked using said clock recovered from said received signal.

8. The invention of claim 4, wherein said obtaining step further comprises the steps of sampling said received signal using a sample and hold circuit to obtain a plurality of values of said received signal.

9. An apparatus for compensating for transmission channel length variations in a SERDES communication system, comprising:
   a) a plurality of transmission line segments;
   b) a plurality of switches adapted to provide intermediate tap points between each of the plurality of transmission line segments;
   c) a plurality of switches adapted to disconnect non-selected transmission line segments from the selected transmission line segments and the selected intermediate tap point; and
   d) an eye monitor feedback circuit adapted to implement a received eye quality monitoring algorithm and used to monitor an eye quality of a data signal of received data, wherein each of the plurality of selectable transmission line segments introduces a corresponding delay in a transmission path of the received data.

10. The invention as recited in claim 9, wherein one or more of the plurality of switches are digitally controlled.

11. The invention of claim 9, wherein the eye monitor feedback circuit for monitoring the data signal is a circuit comprising: a plurality of latches for obtaining a plurality of samples of said data signal for each unit interval based on a clock recovered from said received signal.

12. The invention of claim 9, wherein the eye monitor feedback circuit for monitoring the data signal is a circuit comprising: a sample and hold circuit for obtaining a plurality of samples of said received signal for each unit interval based on a clock recovered from said received signal.

13. The invention as recited in claim 9 wherein a total delay introduced by the plurality of transmission line segments is substantially equal to a fraction of the baud period of a serial data rate of the SERDES communication system.

14. The invention as recited in claim 9, wherein the transmission line segments are substantially equal in length to one another.

15. The invention as recited in claim 9, wherein elements of the plurality of transmission line segments are arranged in a rectangular pattern to reduce physical distance between each of the plurality of tap points and an input terminal of a receiver.

16. The invention as recited in claim 9, wherein elements of the plurality of transmission line segments are arranged in a circular pattern to reduce physical distance between each of the plurality of tap points and an input terminal of a receiver.

17. The invention as recited in claim 9, wherein the apparatus is embodied in an integrated circuit of a SERDES receiver.

18. A machine-readable medium, having encoded thereon program code, wherein, when the program code is executed by a machine, the machine implements a method for signal compensation in a SERDES communication system, comprising the steps of:
   a) monitoring an eye quality of a data signal after passing through a transmission channel with a received eye quality monitoring algorithm;
   b) compensating for channel length variations of the transmission channel by the steps of
      i) adjusting a length of transmission line delay of the data signal from the transmission channel based on eye characteristics from the received eye quality monitoring algorithm;
      ii) comparing the data signal eye quality with a threshold for the adjusted data signal; and
      iii) repeating steps i) and ii) until the data signal eye quality meets the threshold.

19. The invention as recited in claim 18, wherein the step b 1) adjusts the length of transmission line delay by the step of configuring switches adapted to provide intermediate tap points between a plurality of transmission line segments, each transmission line segment providing a corresponding portion of the length of transmission line delay.

20. The invention as recited in claim 19, wherein the length of transmission line delay is substantially equal to a fraction of the baud period of a serial data rate of the SERDES communication system.

* * * * *